Hendrikus J. Bongers
INVENTOR.

BY

Karl J. Ross
Attorney

United States Patent Office 3,687,788
Patented Aug. 29, 1972

3,687,788
APPARATUS FOR MAKING CONVEYOR BELTS
Hendrikus Johannus Bongers, Huls, near Krefeld, Germany, assignor to G. Siempelkamp & Co., Krefeld, Germany
Filed Oct. 16, 1969, Ser. No. 866,828
Claims priority, application Germany, Apr. 30, 1969, P 19 21 968.2
Int. Cl. B32b *31/18, 31/20*
U.S. Cl. 156—510    6 Claims

ABSTRACT OF THE DISCLOSURE

A laminated web of rubber of synthetic resin, with imbedded longitudinal reinforcements, is drawn from a preheated platen press through a tensioning device with two lower and an upper roller horizontally spaced apart, one or more blades being disposed in the immediate vicinity of the upper roller to slice the web longitudinally into two or more strips for the manufacture of conveyor belts narrower than the original web.

---

My present invention relates to an apparatus for the manufacture of reinforced flexible strips to be used, for example, as conveyor belts.

It is known to form conveyor belts with imbedded longitudinal reinforcements, such as wires or cables, by juxtaposing at least two layers of a polymeric material, such as synthetic resin or natural rubber, and laminating them in a heated vulcanizing or bonding press with interposition of the aforementioned reinforcements. The resulting web is drawn from the press by suitable feed means, generally a set of coacting rollers, and is then wound upon a take-up reel.

For effective bonding it is useful to design the laminating press as a device with heated platens of large area clamping the web-forming layers between them for a period sufficient to insure fusion. Thus, the closed platen press may be movable together with the web toward the take-up reel and, upon being opened, may be returned to a position along the web path where bonding has not yet taken place, with subsequent reclosure and another advance toward the take-up reel. While the main press is opened, a similarly reciprocable prepress can hold the as yet unbonded layers clamped to one another to insure their correct relative positioning, with the prepress moving forward while the final press is retracted and vice versa.

In such a system it is, of course, necessary to dimension the platens of at least the final press in accordance with the width of the widest web to be processed; since these platens are thermally conductive, the heat applied thereto spreads over their entire surface and is largely lost when webs of substantially smaller widths are to be produced. Attempts to let several narrower webs run alongside one another through the laminating press have been generally unsuccessful since the common feeding and take-up devices do not act so uniformly upon the webs as to maintain them parallel when the press is open.

It is, therefore, the general object of my present invention to provide means for adapting an apparatus of this type to the efficient manufacture of conveyor belts or the like whose width is a fraction of the maximum width accommodated by the laminating press.

A more specific object is to provide means for precisely subdividing a relatively wide laminated web, immediately upon its formation and before winding it up, into a plurality of narrower strips individually reinforced to serve as conveyor belts or the like.

In accordance with the present invention, I provide a tensioning device in the path of the web between the laminating press and the web-feeding means, this device comprising a set of coacting elements bearing on opposite sides upon the freshly formed web. One or more blades are disposed next to the tensioning device to slice the web longitudinally at a location where it is held taut by the surface-engaging elements of that device. In this way, the web is slitted along one or more perfectly straight lines so that the resulting strips remain parallel along their relatively short path from the tensioning device through the feed means to the take-up reel.

More specifically, the web-engaging elements of the tensioning device comprise a set of three parallel, mutually separated rollers which extend, usually horizontally, with their axes perpendicular to the path of the web. In a preferred embodiment, these rollers include a pair of longitudially spaced lower rollers contacting the underside of the web and an upper counterroller between these lower rollers engaging the upper web surface; the blade or blades are then disposed immediately adjacent the counterroller, preferably ahead of the latter. In order to allow for the manufacture of webs of maximum width, the blade or blades should be retractable by being mounted on a support movable transversely to the plane of the web; to permit the selection of different widths for the strips to be cut from the web, the blade means may also be displaceable transversely to the web path on their adjustable (e.g. elevatable) support.

Naturally, the position of the blade or blades should always be so chosen that the several parallel strips sliced from the web incorporate the necessary number of internal reinforcements, except in the case of a marginal strip cut off the web to trim a belt-forming strip to its proper size.

The above and other features of my invention will be described in greater detail with reference to the accompanying drawing in which.

Figure 2:
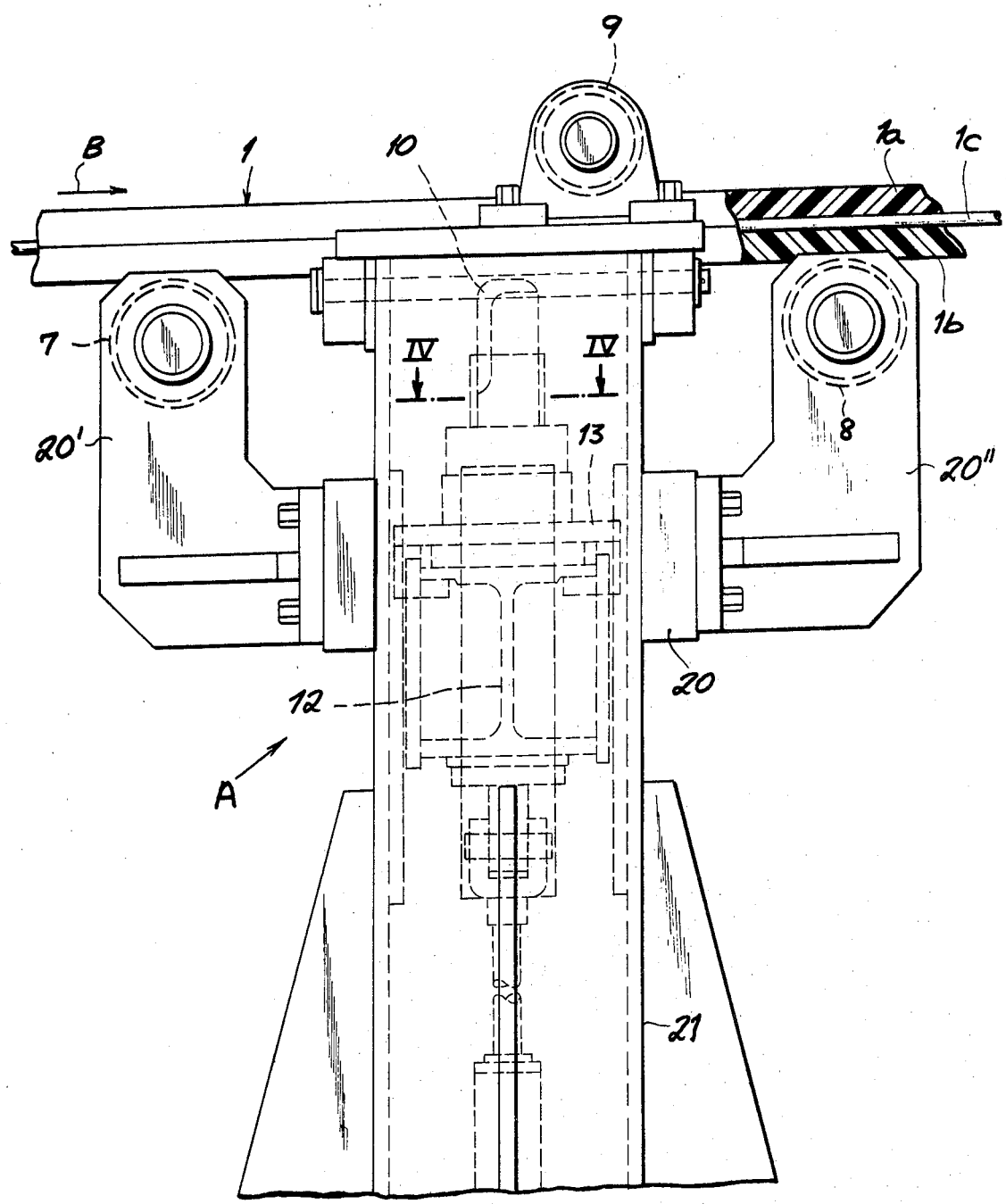
FIG. 2 is a side-elevational view, drawn to a larger scale, of a tensioning and cutting unit forming part of the assembly of FIG. 1.
Figure 3:
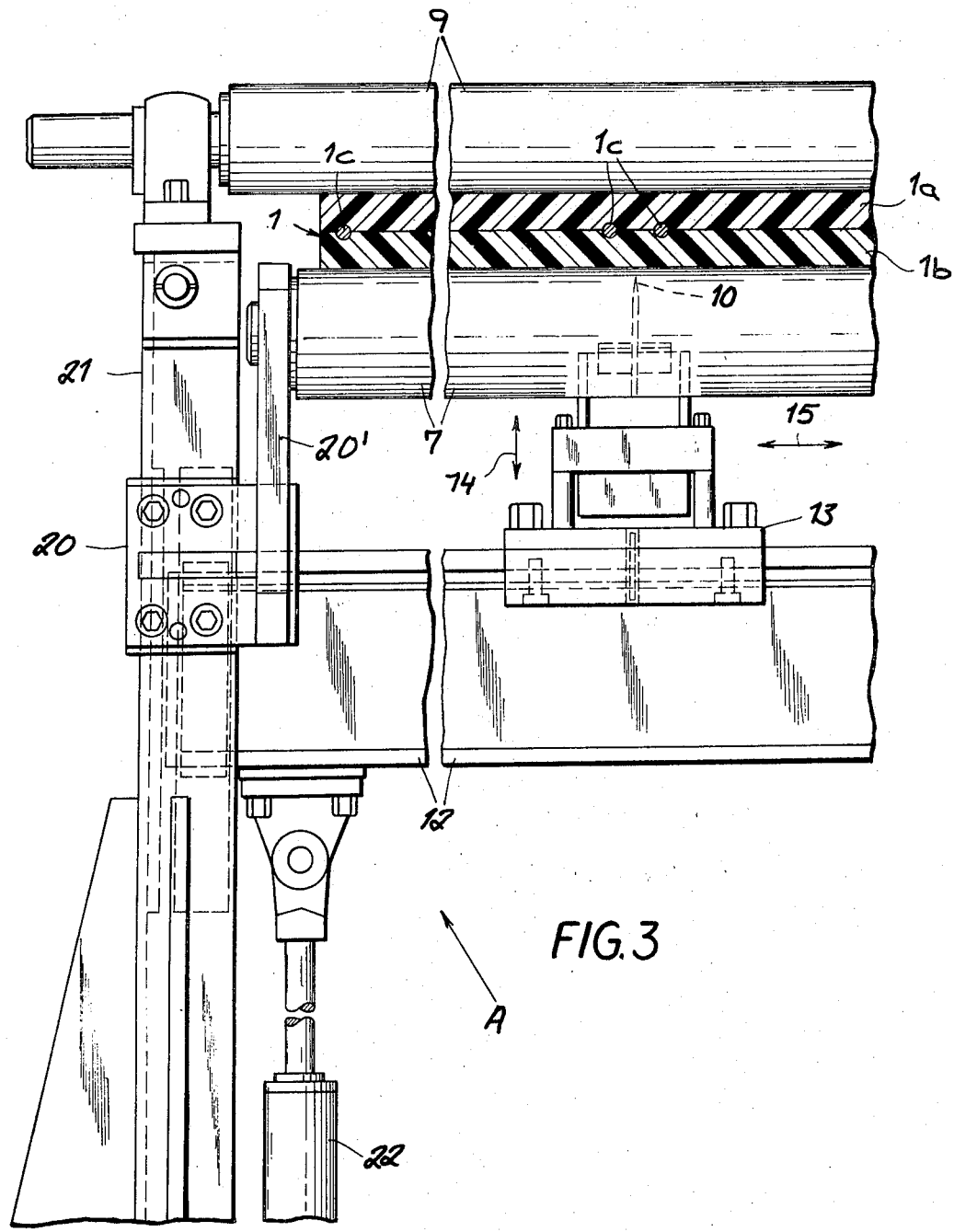
FIG. 3 is a partial rear-elevational view of the same unit as viewed from the left in FIG. 2.
Figure 4:
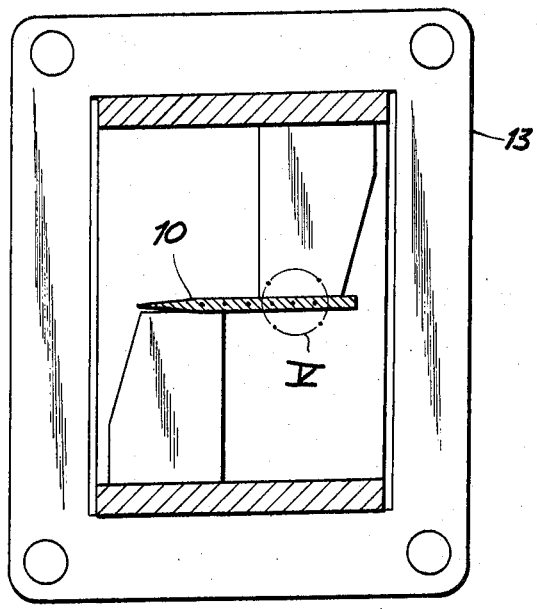
FIG. 4 is a sectional detail view taken on the line IV—IV of FIG. 2 and drawn to a still larger scale.

The apparatus shown in the drawing, designed to produce a web 1 of plastic elastomeric material, comprises a laminating press 2 with upper and lower heated platens 3, 4 and with an outlet 16, a feeding device 5 with three coacting transport rollers 17, 18, 19 (at least one of which is driven), a take-up reel 6 just beyond the device 5, and a tensioning unit A illustrated in greater detail in FIGS. 2 and 3. Unit A comprises two lower outer rollers 7, 8 and a central counterroller 9 whose relative vertical separation from the other two rollers is adjustable to allow for different thicknesses of the web 1 engaged thereby, the web remaining substantially straight while moving past these rollers. Such vertical adjustment is possible through the raising or lowering of a pair of brackets 20 on respective lateral standards 21 (only one shown) supporting the roller 9, the brackets 20 having extremities 20', 20" on which the rollers 7 and 8 are journaled. As shown, the path of web 1 from press 2 to feeder 5 is horizontal so that rollers 9 and 7, 8 lie substantially on the level of platens 3 and 4, respectively. These rollers, therefore, are substantially tangent to a common horizontal plane, i.e. the plane of the web 1.

The web 1 is composed of a pair of thermoplastic or other polymeric layers 1a, 1b which are fed from separate supply reels, not shown, to the laminating press 2 for bonding to each other. Reinforcing wires or cables 1c, extending longitudinally of the web path, are sandwiched between the layers 1a and 1b in sufficient numbers to allow for the longitudinal splitting of the web into two or more parallel, individually reinforced strips. Such splitting is accomplished with the aid of one or more blades 10 (only one shown) which are supported on a carriage 13 riding on a transverse beam 12 whose ends are slidably guided in the standards 21; the height of the beam 12 can be varied, e.g. hydraulically, with the aid of several extensible supports 22 (only one shown) of the piston-and-cylinder type. The displacement of the carriage 13 along beam 12, in the direction of arrow 15 (FIG. 3), may be carried out manually by a leadscrew or equivalent conventional means.

Figure 5:
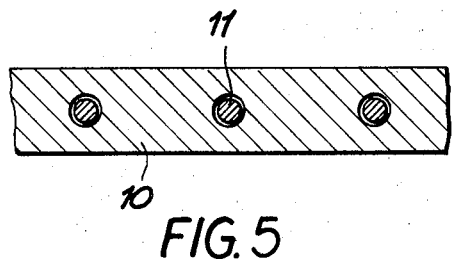
FIG. 5 is a sectional view, yet further enlarged, of a detail contained in the circle V of FIG. 4.

The blade 10 is shown disposed close to the upper roller 9 and slightly ahead of its axis as viewed in the direction of web motion (arrow B, FIG. 2), thus with a short horizontal stretch of the web path extending between rollers 7 and 9. As illustrated in FIG. 5, heating elements 11 may be inserted into the body of the blade to facilitate the cutting operation, particularly with thermoplastic web materials.

Figure 1:
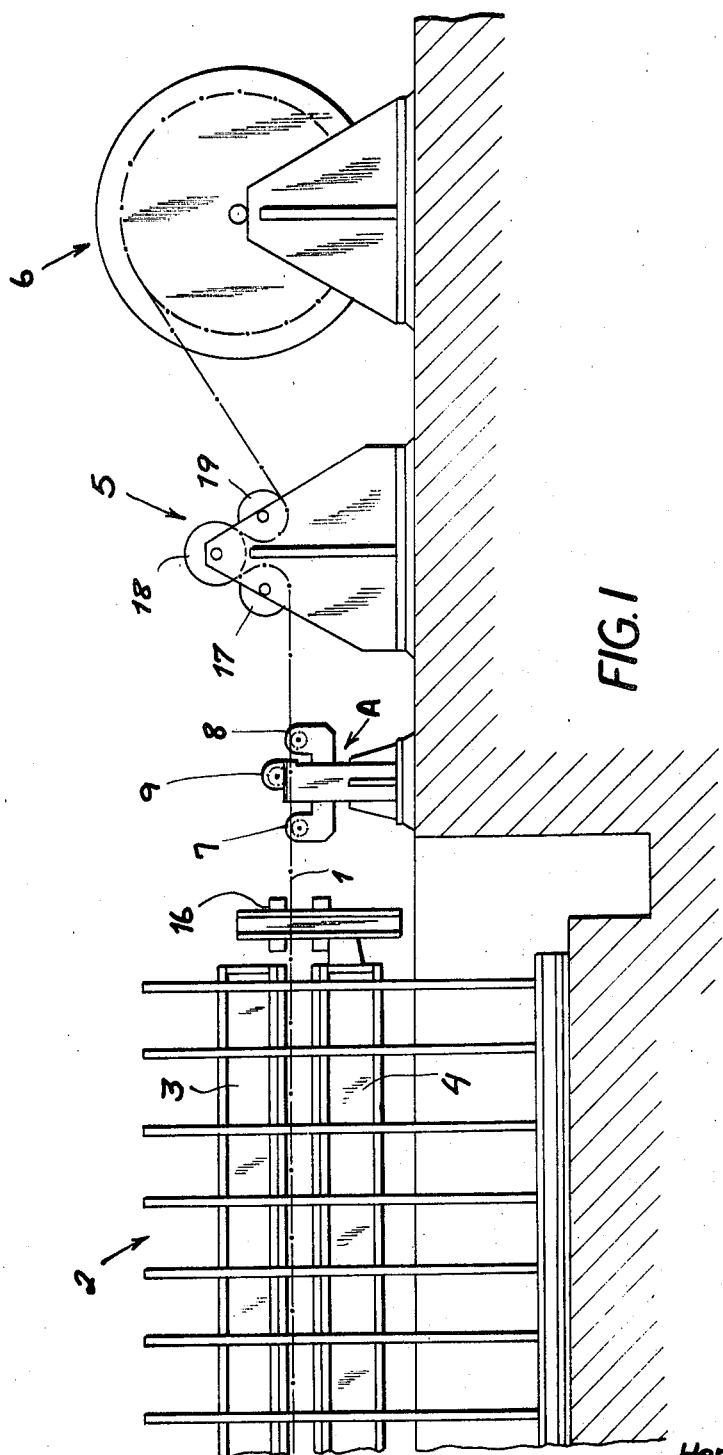
FIG. 1 is a somewhat diagrammatic side-elevational view of an apparatus embodying my invention.

In operation, the laminating press 2 may be reciprocable in its closed phase, together with the web 1, toward the take-up reel 6 (i.e. to the right in FIG. 1) and may be retractable, at an accelerated rate, to a starting point at the left to grip an as yet unbonded portion of the web which has continuously or intermittently moved forward under the control of the feed means 5. A prepress, not shown, to the left of main press 2 may hold the layers 1a, 1b and the inserted reinforcing wires or cables 1c in their proper e.g. relative position when the press 2 is open, advancing with the web to the right until the press 2 closes whereupon the prepress releases the web and returns to its starting point.

Although a stationary, flat blade 10 has been shown by way of example, it will be apparent that disk-shaped rotary cutters can be used in its stead.

Reciprocation of the press 2 is, of course, unnecessary if the take-up reel 6 is driven only intermittently.

I claim:

1. An apparatus for the manufacture of reinforced flexible strips, comprising:

press means provided with a pair of horizontal platens for producing an elongate web from juxtaposed layers of polymeric material with imbedded longitudinal reinforcements;

a set of horizontal feed rollers remote from said press means engageable with said web from opposite sides for drawing same substantially horizontally from said platens;

a set of horizontal tensioning rollers interposed between said press means and said feed rollers, said tensioning rollers being substantially tangent to a common horizontal plane and including a pair of outer rollers on one side of said plane and a central roller on the other side of said plane, said rollers being horizontally separated to define short stretches along which the web moves taut without substantial deflection from the horizontal; and blade means projecting vertically into one of said stretches between said central roller and one of said outer rollers for slitting the web.

2. An apparatus as defined in claim 1, further comprising vertically movable support means for said blade.

3. An apparatus as defined in claim 2 wherein said support means includes an elevatable beam beneath said rollers.

4. An apparatus as defined in claim 3 wherein said support means further includes a carriage displaceable on said beam transversely to said path.

5. An apparatus as defined in claim 1 wherein said blade means comprises at least one cutter provided with heating means.

6. An apparatus as defined in claim 1 wherein said press means comprises a laminating press, said platens being heated.

References Cited
UNITED STATES PATENTS

| | | | |
|---|---|---|---|
| 1,885,280 | 11/1932 | Moore. | |
| 2,026,754 | 1/1936 | Stafford | 156—510 |
| 2,278,533 | 4/1942 | Desautels | 156—510 |
| 3,133,850 | 5/1964 | Alenius | 156—510 |
| 3,156,010 | 11/1964 | Osborn | 156—515 |
| 3,272,680 | 9/1966 | Paasche | 156—160 |
| 3,494,232 | 2/1970 | Lindau | 83—408 |

BENJAMIN A. BORCHELT, Primary Examiner

J. V. DORAMUS, Assistant Examiner

U.S. Cl. X.R.

156—494, 522